March 9, 1954  O. GIROUX  2,671,684
TOOL FOR TRAINMEN
Filed Nov. 7, 1951
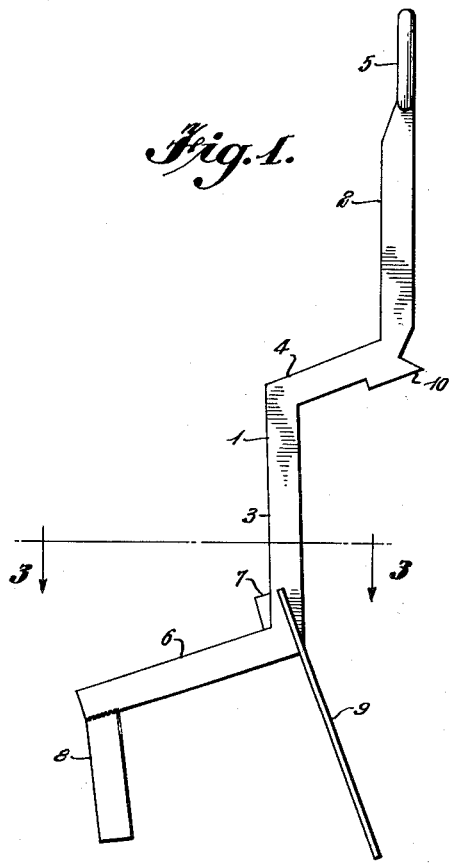
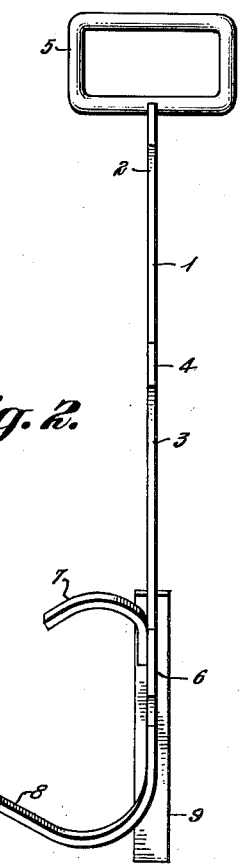
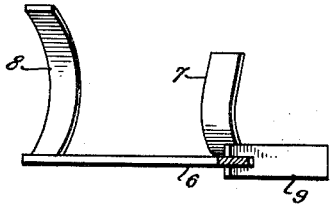
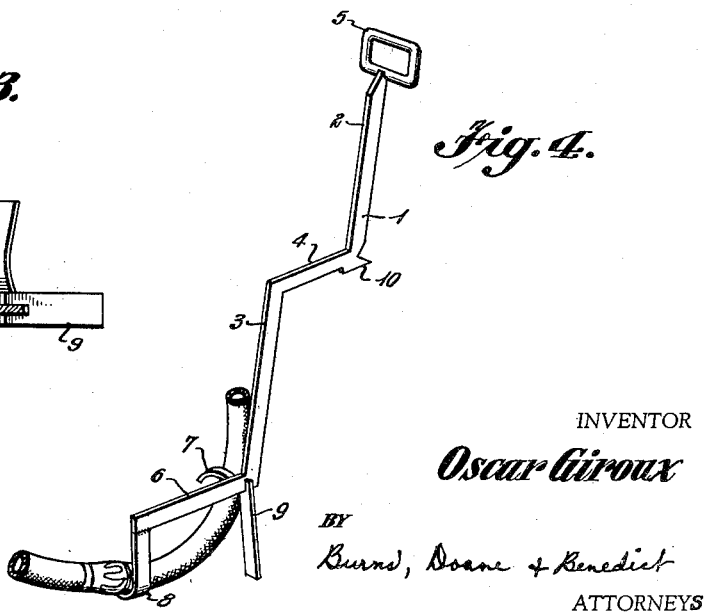
INVENTOR
*Oscar Giroux*
BY
*Burns, Doane & Benedict*
ATTORNEYS Patented Mar. 9, 1954

2,671,684

UNITED STATES PATENT OFFICE 2,671,684

TOOL FOR TRAINMEN

Oscar Giroux, Rouyn, Quebec, Canada

Application November 7, 1951, Serial No. 255,225

2 Claims. (Cl. 294—18)

This invention relates to a tool for trainmen. More particularly, the invention relates to a tool for manipulating air brake hoses and journal box covers on railway cars.

The necessary coupling and uncoupling of air brake hoses between railway cars is a dangerous task. Such brake hoses normally carry air under a pressure of from about 70 to 90 pounds per square inch. When the connections between such hoses are broken, the hose ends which are provided with heavy metal fastening means, are thrown about as a consequence of the sudden release of the air pressure in the hose. It is not uncommon for railroad workers to be struck and seriously injured by such air brake hose ends. This situation is aggravated by the fact that the brake hoses of conventional railway cars are positioned substantially centrally at the ends of the cars and are connected beneath the couplings between the cars. By virtue of the position of the air brake hoses, trainmen are led to crawl under the cars to effect the manipulation of the air brake hoses. In such position, the trainmen are highly vulnerable to injury resulting from disconnected hose ends. Furthermore, trainmen in kneeling position between railway cars are subjected to the very great danger of being seriously injured by an unexpected movement of the train itself. The problem thus presented is of such gravity as to give rise to safety posters and like efforts on the part of railroad companies to educate trainmen in a proper and safe manner of effecting air brake hose uncoupling operations.

The opening and manipulation of journal box covers on railway car trucks is an additional duty which places trainmen in danger of physical injury as the consequence of the position normally assumed to perform this work.

It is a primary object of this invention to provide a tool for the safe manipulation of air brake hoses. It is an additional object of the invention to provide a tool of the type described which, as a consequence of its unique design, may readily be placed in operative position to manipulate air brake hoses between either passenger or freight cars.

It is an additional primary object of the invention to provide a tool for manipulating air brake hoses which may be employed by trainmen standing erect in a safe position at the side of the railway cars in question.

It is a still further object of the invention to provide a tool of the type described which, when placed in operative position on a coupled air brake hose between two railway cars, requires but a single, downwardly thrusting, movement to disengage the air brake hose connection.

It is yet another object of the invention to provide a tool which, when employed to disengage air brake hose connections, will safely control the uncoupled hose end to which it is applied and thus prevent injury to the trainman uncoupling the hose.

It is yet another object of the invention to provide a tool of the type described which may be employed to safely and efficiently open journal box covers on conventional railway trucks.

The invention will be better understood by reference to the accompanying drawings in which:

Figure 1 is a perspective view of a tool such as provided by the present invention;

Figure 2 is another perspective view of the tool shown in Figure 1 further illustrating the disposition of the hook-like air hose engaging members of the tool;

Figure 3 is a cross-sectional view along the line 3—3 of Figure 1; and

Figure 4 is a perspective view of the tool illustrating the manner of engagement of said tool with an air brake hose.

Broadly speaking, the present invention embraces a device for manipulating air brake hoses which comprises a rigid member composed of an upper handle portion, an intermediate portion laterally offset from said upper handle portion, an offset portion rigidly connecting said handle portion and said intermediate portion, a lower foot portion rigidly connected to said intermediate portion and extending therefrom in a direction generally opposite to that in which the offset portion extends from the intermediate portion, a downwardly directed hook on the foot portion positioned adjacent to said intermediate portion, and an upwardly directed hook on said foot spaced from said downwardly directed hook. The tool of the invention may be appropriately provided with a guide means extending downwardly from the foot portion in a direction generally opposite said intermediate portion, said guide means cooperating with the aforementioned hooks to facilitate positioning of the tool in operative engagement with the air brake hose to be uncoupled.

The tool is also appropriately provided with a hook or lip means positioned adjacent the end of the handle portion connected to the offset portion and extending from said handle portion in a direction generally opposite said offset portion.

As shown in Figures 1 to 4 the tool embraces a rigid member 1, preferably fabricated from metal, such as steel having an upper handle portion 2, an intermediate portion 3 and an offset portion 4 rigidly connecting the upper handle portion 2 and the intermediate portion 3. As shown in the drawing, which represents a preferred form of the invention, the intermediate portion 3 is generally parallel to the upper handle portion 2. The upper handle portion 2 is expediently provided with a handle grip 5.

The tool as shown in the drawings additionally embraces a lower foot portion 6 extending from said intermediate portion 3 in a direction generally opposite that in which the offset portion 4 extends from the intermediate portion 3. In the preferred form of the invention, as shown in the drawings, the lower foot portion 6 is generally parallel to the offset portion 4.

The lower foot portion 6 is appropriately provided with a downwardly directed hook 7 positioned adjacent the intermediate portion 3 and an upwardly directed hook 8 positioned on the free end of the foot portion 6. As shown in the drawing, the upwardly directed hook 8 is provided with a substantially longer shank than the downwardly directed hook 7 to facilitate the engagement of the hooks with an air brake hose.

In its preferred embodiment, the tool of the invention is provided with a guide means 9 to facilitate the positioning of the tool in operative engagement with an air brake hose. The guide means 9 further serves as a guard or shield against the erratic movements of an uncoupled hose. As shown in the drawings, and particularly in Figures 1 and 4, the guide means 9 takes the form of a bar extending generally downwardly from the lower foot portion 6 when the tool is in operative engagement with the air brake hose. It will be observed that in the preferred embodiment, shown in the figures, the guide means 9 extends from the lower foot portion 6 from a point adjacent the intermediate portion 3 of the tool. Those skilled in the art will appreciate that the guide means 9 may be otherwise positioned if so desired.

It will be observed that guide means 9, when placed in contact with a coupled air hose which it is desired to uncouple and pushed downwardly in contact with such air hose, will serve to guide the downwardly directed hook 7 directly into operative contact with the air hose. When the tool of the invention is thereafter given a downward thrust requisite to uncouple the air hose, the upwardly directed hook 8 will be brought into operative engagement with the air hose and the uncoupling effected in one continuous operation. Should the air hose, after being uncoupled, escape from hook 8, it will be apparent that the guide means 9 will aid in restricting the erratic motion of the uncoupled air hose and thereby reduce the possibility of injury to the trainman utilizing the tool.

The tool of the invention is further provided with a lip 10 extending from the upper handle portion 2 of the tool in a direction generally opposite that in which the offset portion 4 extends from the handle portion 2. It will be observed that in the preferred embodiment of the invention as shown in the drawings, the lip 10 is positioned on the upper handle portion 2 at a point adjacent the offset portion 4. The lip 10 is utilized when the tool of the invention is employed to open journal box covers.

It is to be understood that the specific relative positions of the various elements of the tool of the invention as shown in the drawings represent a preferred form and that other appropriate relationships may be employed. Specifically, it will be appreciated that tools in which the upper handle portion 2 of the intermediate portion 3 are not precisely parallel are contemplated by the invention. Likewise tools in which the offset portion 4 and the foot portion 6 are not parallel are contemplated. Likewise the positioning of the hooks 7 and 8 on the lower foot portion 6 may be otherwise than as shown in the drawings.

The offset structure of the tool of the invention, as provided by the offset portion 4 connecting the handle portion 2 and the intermediate portion 3, is of marked utility, for the reason that air hoses of trains are disposed substantially centrally between the connected train cars. As a consequence of the offset structure of the tool of the invention, it is possible to manipulate the air hoses with great facility. This feature of the tool is of particular significance when the tool is utilized to uncouple passenger train cars. Passenger train cars are provided with end platforms extending above the hose connections. The bottoms of these end platforms are only a short distance above the coupled hoses. As a consequence of the offset structure of the tool of this invention, however, passenger car air hoses may be uncoupled with ease and efficiency.

A salient feature of the invention resides in the fact that the upper handle portion 2, the intermediate portion 3, the offset portion 4, and the lower foot portion 6 lie in the same plane. As a consequence of this design, the efficiency of the tool is greatly increased and trainmen may utilize the same from an erect position alongside the train cars. There is thus obviated the necessity of assuming any position intermediate the train cars to effect the disconnection of air brake hoses.

To manipulate an air brake hose utilizing tool of this invention, a trainman through the cooperation of the guide means 9 positions the hooks 7 and 8 in operative engagement with one of the two hose elements to be uncoupled. As a consequence of the offset structure of the tool of the invention, the lower foot portion 6 carrying the hose engaging hooks 7 and 8 may be operatively positioned by a trainman standing erect alongside the cars, the hoses of which are to be disconnected. The proper positioning of the tool in operative engagement with a hose element is remarkably facilitated by the guide means 9. The guide means 9 is of particular significance when air hoses must be manipulated in the dark as is frequently the case.

As will be observed from Figure 4, the tool of the invention when in operative engagement with the coupled air brake hose assumes an upright position in which the upper handle portion 2 extends generally upwardly in a convenient manner alongside the cars to be discoupled. To effect the disconnection of the hoses, the trainman simply grasps the handle grip 5 and applies to the same a direct downward thrust which is in effect a continuation of the movement required to effect the engagement of the tool with the air brake hose. By this simple operation the air brake hose is efficiently and safely disconnected and is restrained from erratic and dangerous movement by the hook means 7 and 8 which may be assisted by the guide means 9.

It will be appreciated by those skilled in the art that the tool of this invention represents a significant contribution over the tools of the prior art to accomplish the same purpose. Specifically, it will be appreciated that the tool of this invention represents a signal improvement over the devices of the prior art which require long shanks and in which the hose engaging members are disposed at substantially right angles to the shank. Such prior art devices depend upon a twisting motion effected primarily through the medium of the user's wrists. Frequently hose couplings on trains become frozen and coated with ice, whereby tools depending upon such twisting action of the user's wrists may be rendered ineffective. As a consequence of the fact that the various elements of the tool of this invention lie in the same plane, the efficiency and adaptability of the tool of the invention is markedly superior to that of any known to the prior art. By virtue of this planer structure, a user of the tool of this invention may place the tool in operative engagement with the hose to be connected and then apply his whole weight to the downward thrust by which the hose couplings are disconnected. Thus, with very little effort, great force is applied to the hose coupling.

It will be appreciated that two trainmen using the tool of the invention can safely disconnect air brake hoses without placing themselves in danger of bodily harm.

In utilizing the tool of the invention to effect the opening of the journal box covers of conventional railway car trucks, the lip 10 of the tool as shown in the drawings is placed in engagement with the lid of the journal box and a simple upward movement effects the necessary opening. In the case of journal boxes on passenger cars, the guide means 9 of the tool cooperates with the lip 10. Specifically, the guide means 9 is positioned on the cross-bar conventionally present on the bottom of journal boxes of railway passenger cars and serves to guide and facilitate the engagement of the lip 10 with the journal box cover. Subsequent to the engagement of the lip 10 with the journal box cover the guide means 9 serves in cooperation with the upper handle portion 2, the intermediate portion 3, and the offset portion 4 of the tool as a lever to facilitate the opening of the journal box cover.

I claim:

1. A tool for disconnecting the coupling between air hoses of railway cars which hoses are suspended between the cars with the coupling at the lowermost portion of the loop formed by the suspended hoses, said tool comprising a foot portion arranged to be positioned in a generally horizontal position beside one of the hoses to be uncoupled, an elongated shank secured to one end of said foot portion and extending generally downwardly therefrom, an upwardly facing hook at the lower end of said shank for engaging the lower surface of such one hose adjacent the coupling, a downwardly facing hook secured to the opposite end of said foot portion for engaging the upper surface of such one hose at a position substantially spaced from the coupling, an elongated guide means extending generally downwardly from said opposite end of said foot portion with the upper end of said guide means terminating adjacent said downwardly facing hook whereby intermediate portions of said elongated shank and said elongated guide means may be placed against such one hose to guide said hooks into engagement with such one hose upon tilting said foot portion, and a handle portion attached to said opposite end of said foot portion to engage said hooks with such one hose and to disconnect the coupling.

2. A tool for disconnecting the coupling between air hoses of railway cars which hoses are suspended between the cars with the coupling at the lowermost portion of the loop formed by the suspended hoses, said tool comprising a foot portion arranged to be positioned in a generally horizontal position beside one of the hoses to be uncoupled, an elongated shank secured to one end of said foot portion and extending generally downwardly therefrom, an upwardly facing hook at the lower end of said shank for engaging the lower surface of such one hose adjacent the coupling, a downwardly facing hook secured to the opposite end of said foot portion for engaging the upper surface of such one hose at a position substantially spaced from the coupling, an elongated guide means extending generally downwardly from said opposite end of said foot portion with the upper end of said guide means terminating adjacent said downwardly facing hook whereby intermediate portions of said elongated shank and said elongated guide means may be placed against such one hose to guide said hooks into engagement with such one hose upon tilting said foot portion, an upwardly extending handle portion attached to said foot portion adjacent said elongated guide means, and an offset portion connecting said handle portion and said foot portion lying in the same plane as said handle and foot portions whereby said foot portion may be easily positioned beside such one hose to engage said hooks and to disconnect the coupling.

OSCAR GIROUX.

References Cited in the file of this patent

UNITED STATES PATENTS

| Number | Name | Date |
|---|---|---|
| 916,858 | Geisking | Mar. 30, 1909 |
| 1,056,506 | Courson | Mar. 18, 1913 |
| 1,354,448 | Walt | Sept. 28, 1920 |
| 1,834,503 | Smith | Dec. 1, 1931 |